(12) United States Patent
Huang et al.

(10) Patent No.: US 7,082,123 B2
(45) Date of Patent: Jul. 25, 2006

(54) SILENT REDIAL SYSTEM FOR VOIP MODEM

(75) Inventors: Ying-Chieh Huang, Hsin-Chu (TW); Chih-Cheng Huang, Hsin-Chu (TW); Ching-Mao Yeh, Hsin-Chu (TW)

(73) Assignee: Ambit Microsystems Corp., Hsin-Chu (TW)

( * ) Notice: Subject to any disclaimer, the term of this patent is extended or adjusted under 35 U.S.C. 154(b) by 869 days.

(21) Appl. No.: 10/064,833

(22) Filed: Aug. 21, 2002

(65) Prior Publication Data

US 2004/0037265 A1     Feb. 26, 2004

(51) Int. Cl.
  *H04L 12/66*     (2006.01)
(52) U.S. Cl. .................. 370/352; 379/359; 379/362
(58) Field of Classification Search .............. None
  See application file for complete search history.

(56) References Cited

U.S. PATENT DOCUMENTS 6,345,047 B1 *  2/2002  Regnier ................. 370/352
6,377,570 B1 *  4/2002  Vaziri et al. ............. 370/352
6,424,647 B1 *  7/2002  Ng et al. ................ 370/352
6,614,786 B1 *  9/2003  Byers .................... 370/353
6,700,956 B1 *  3/2004  Chang et al. ........... 379/93.09
6,914,978 B1 *  7/2005  Huang et al. ............ 379/359

* cited by examiner

*Primary Examiner*—Frank Duong
(74) *Attorney, Agent, or Firm*—Winston Hsu

(57) ABSTRACT

A redial system for a VoIP modem includes a subscriber line interface circuit (SLIC) for interfacing analog telephone signals from a telephone set to the VoIP modem and for generating redial signals to a public switched telephone network (PSTN), a first relay for connecting the telephone set with the PSTN or connecting the telephone set with the SLIC, a dummy load, a second relay connected between the PSTN and the dummy load for establishing or de-establishing a connection between the PSTN and the dummy load, a third relay connected between the first relay and the SLIC for establishing or de-establishing a connection between the first relay and the SLIC, and a control circuit for controlling the second and third relays to establish the connection between the PSTN and the dummy load and de-establish the connection between the first relay and the SLIC during the generation of the redial signals.

14 Claims, 4 Drawing Sheets

SILENT REDIAL SYSTEM FOR VOIP MODEM

BACKGROUND OF INVENTION

1. Field of the Invention

The present invention relates to a VoIP modem, and more specifically, to a VoIP modem capable of performing a silent redial with a public switched telephone network (PSTN).

2. Description of the Prior Art

With the growing popularity of high-speed Internet connections, it is now feasible for Voice over Internet Protocol (VoIP) phone calls to be made over the Internet. One main advantage of using the VoIP modem is VoIP phone calls are significantly less expensive than phone calls made over a public switched telephone network (PSTN). Unfortunately, there are times where quality of a VoIP connection suffers, and it is desired to switch the phone connection to the PSTN. Therefore, VoIP modems with PSTN backup capabilities have been developed. The VoIP modem is originally set in VoIP mode, and a user is allowed to switch it into PSTN mode to make a telephone call through PSTN. Additionally, it is desirable to use the PSTN in emergency situations due to its relative stability compared to VoIP connections. In this situation, the existing VoIP connection with a subscriber line interface circuit (SLIC) must be disconnected, and the VoIP modem establishes a new connection with the PSTN and automatically redials the number to PSTN.

Please refer to FIG. 1. FIG. 1 is a block diagram of a VoIP modem redial system 10 according to the prior art. The VoIP modem redial system 10 comprises a telephone set 12 and a mechanical relay 20 for connecting the telephone set 12 to a PSTN 22 or to a SLIC 14. A subscriber line interface circuit (SLIC) is used for interfacing analog telephone signals with a VoIP modem so that the voice data can be transferred through the VoIP network. In addition, the VoIP modem redial system 10 comprises an off-hook and ring detect circuit 18 connected to the PSTN 22 and to the telephone set 12 through the mechanical relay 20 for detecting a ring signal from the PSTN 22 and an off-hook status of the telephone set 12. Finally, a dual tone multi-frequency (DTMF) redial coupling circuit 16 is connected between the SLIC 14 and the PSTN 22 for passing redial signals from the SLIC 14 to the PSTN 22.

When the VoIP has a not ready status, the mechanical relay 20 will switch such that the telephone set 12 is connected to the PSTN 22, and the user can make phone call with the PSTN 22. Alternately, if the VoIP had a ready status, then the mechanical relay 20 will switch to connect the telephone set 12 to the SLIC 14 in order to utilize the VoIP service. A user can dial a predetermined code, for example "****", to manually switch the relay 20 to connect the telephone set 12 to the PSTN 22.

Although making telephone calls over a VoIP network is less expensive, the voice quality of the VoIP phone calls is sometimes unstable, and, in some important situations, such as in an emergency, the user does not wish to encounter telephone service failure. In VoIP modems with PSTN backup capability, if the user dials in VoIP mode a telephone number (such as 911) which is pre-stored in the device, the number will be automatically redialed to PSTN to establish a phone call through the PSTN instead of through the VoIP network. That is, the VoIP modem redial system 10 will automatically switch the mechanical relay 20 to be connected to the PSTN 22 and send a redial signal to it. If the telephone set 12 uses tone-dialing, the SLIC will produce DTMF tone redial signals and send the signal to PSTN 22 through the DTMF redial coupling circuit 16. On the other hand, if the telephone set 12 uses pulse-dialing, the mechanical relay 20 will be controlled to quickly open and close to produce the correct dialing pulses. In this way, automatic redial is performed by the VoIP modem redial system 10.

In the above system, the redialing process is performed while the telephone set 12 is directly connected to the PSTN 22. This means that the user will hear redialing sounds associated with either the DTMF tone redial or the dialing pulse redial. However, these audible redialing sounds are distracting to the user of the VoIP modem redial system 10. The user can become confused when hearing these redialing sounds.

SUMMARY OF INVENTION

It is therefore a primary objective of the claimed invention to provide a silent redial system for a VoIP modem in order to solve the above-mentioned problems.

According to the claimed invention, a redial system for a VoIP modem comprises a subscriber line interface circuit (SLIC), for interfacing analog telephone signals from a telephone set to the VoIP modem, and for generating, when receiving a dialed telephone number which matches a predetermined telephone number, redial signals to a public switched telephone network (PSTN). The redial system for a VoIP modem also includes a first relay for selectively connecting the telephone set with the PSTN or connecting the telephone set with the SLIC, a dummy load, a second relay connected between the PSTN and the dummy load for selectively establishing or de-establishing a connection between the PSTN and the dummy load, a third relay connected between the first relay and the SLIC for selectively establishing or de-establishing a connection between the first relay and the SLIC, and a control means for controlling the second and third relays to establish the connection between the PSTN and the dummy load and de-establish the connection between the first relay and the SLIC during the generation of the redial signals.

It is an advantage of the claimed invention that the telephone set is not connected to the PSTN when redialing signals are being transmitted in order to keep a user from hearing sounds associated with the redialing process. In this way, a silent automatic redial function is performed.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
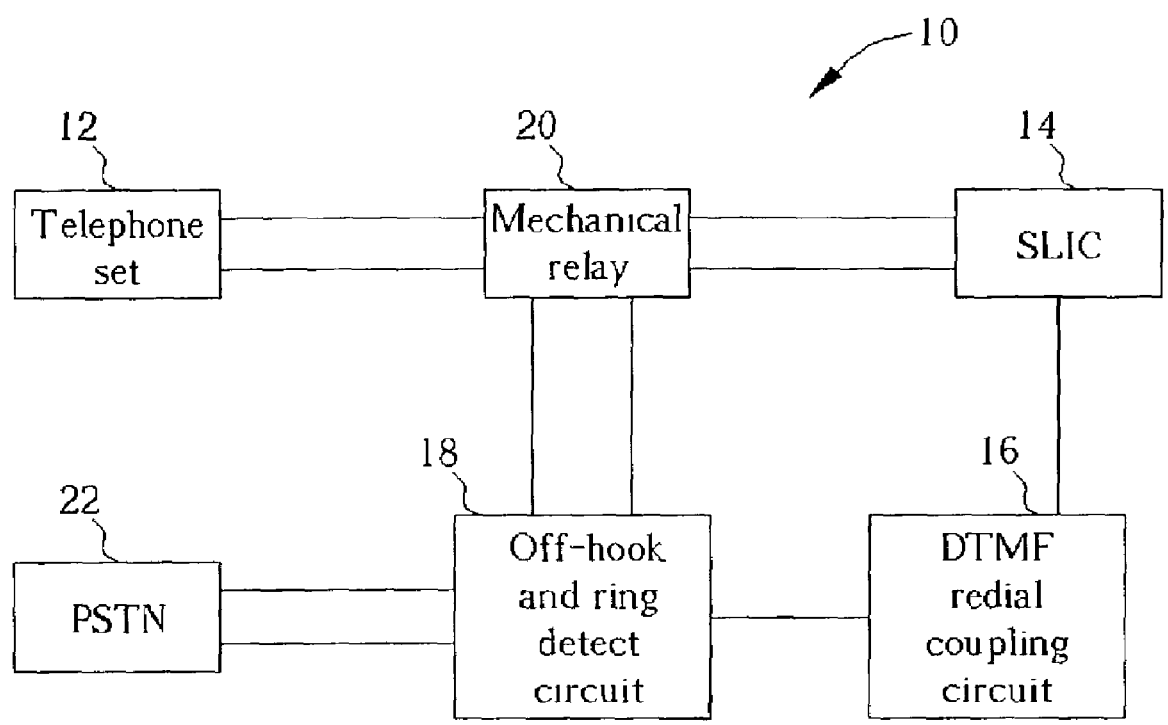
FIG. 1 is a block diagram of a VoIP modem redial system according to the prior art.
Figure 2:
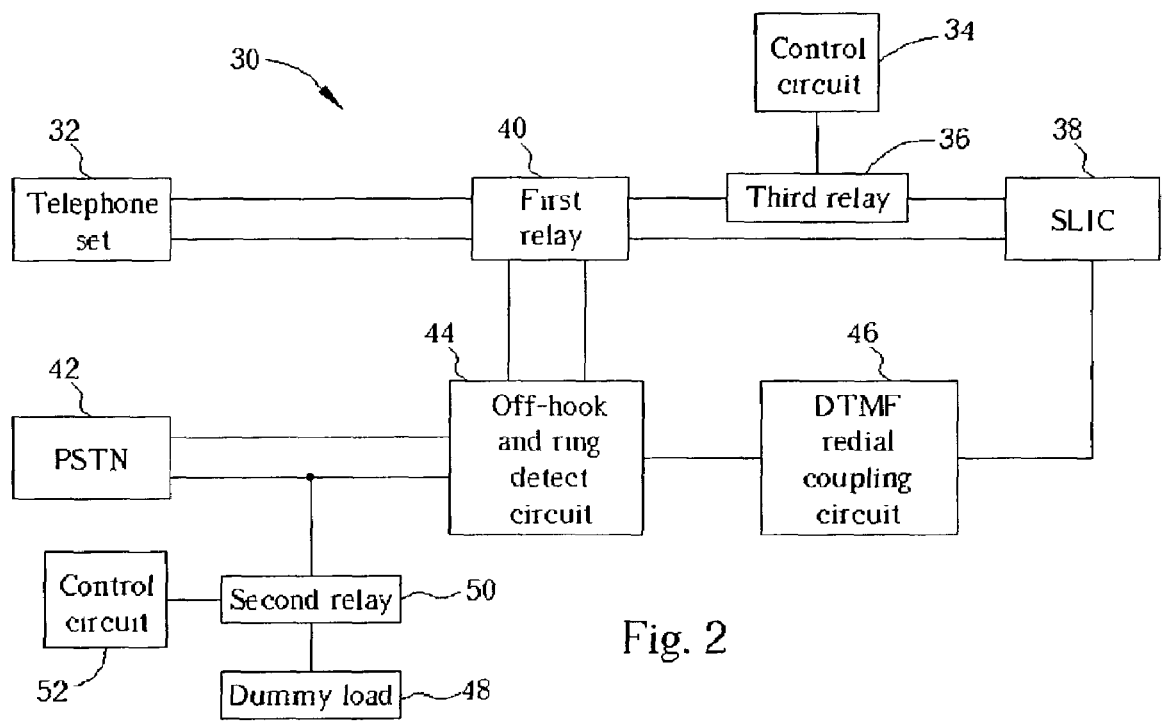
FIG. 2 is a block diagram of a VoIP modem redial system according to the present invention.

Please refer to FIG. 2. FIG. 2 is a block diagram of a VoIP modem redial system 30 according to the present invention.

The VoIP modem redial system 30 comprises a subscriber line interface circuit (SLIC) 38, for interfacing analog telephone signals from a telephone set 32 to the VoIP modem to couple the telephone set 32 to a VoIP network, and for generating, when receiving a dialed telephone number which matches a predetermined telephone number stored in the modem, redial signals to a public switched telephone network (PSTN) 42. The VoIP modem redial system 30 also comprises a first relay 40, preferably a mechanical relay, for selectively connecting the telephone set 32 with the PSTN 42 or connecting the telephone set 32 with the SLIC 38. The VoIP modem redial system 30 further includes a dummy load 48, and a second and third relay 50, 36, which are preferably photo relays. The second relay 50 is connected between the PSTN 42 and the dummy load 48 for selectively establishing or de-establishing a connection between the PSTN 42 and the dummy load 48, and the third relay 36 is connected between the first relay 40 and the SLIC 38 for selectively establishing or de-establishing a connection between the first relay 40 and the SLIC 38. Two control circuits 52, 34 are used for controlling the second and third relays 50, 36, respectively. The second and third relays 50, 36 are controlled to open and close to establish the connection between the PSTN 42 and the dummy load 48 and to de-establish the connection between the first relay 40 and the SLIC 38 during the generation of the redial signals.

The VoIP modem redial system 30 further comprises an off-hook and ring detect circuit 44 electrically connected to the telephone set 32 through the first relay 40 and to the PSTN 42 for detecting an off-hook status of the telephone set 32 and for detecting ringing signals of incoming calls from the PSTN 42. Also, a DTMF (dual tone multi-frequency) redial coupling circuit 46 is electrically connected between the SLIC 38 and the PSTN 42 for coupling the redial signals to the off-hook and ring detect circuit 44 and for isolating voltages of the off-hook and ring detect circuit 44 from voltages of the SLIC 38.

As described in the prior art, in the case of an emergency, it is desirable to use the PSTN due to its relative stability compared to VoIP connections. For example, a predetermined dialing rule or a predetermined number such as "911" is stored in the modem. When a user dials a number which matches the stored dialing rule or number, the redialing process will be initiated to establish a new connection over the PSTN.

Different redialing procedures are used respectively for telephones that use tone-dialing and for telephones that use pulse-dialing. In each case, the VoIP modem redial system 30 is initially in VoIP mode. This means that the first relay 40 is switched to connect the telephone set 32 to the SLIC 38. Furthermore, the second relay 50 is open and the third relay 36 is closed.

Figure 3:
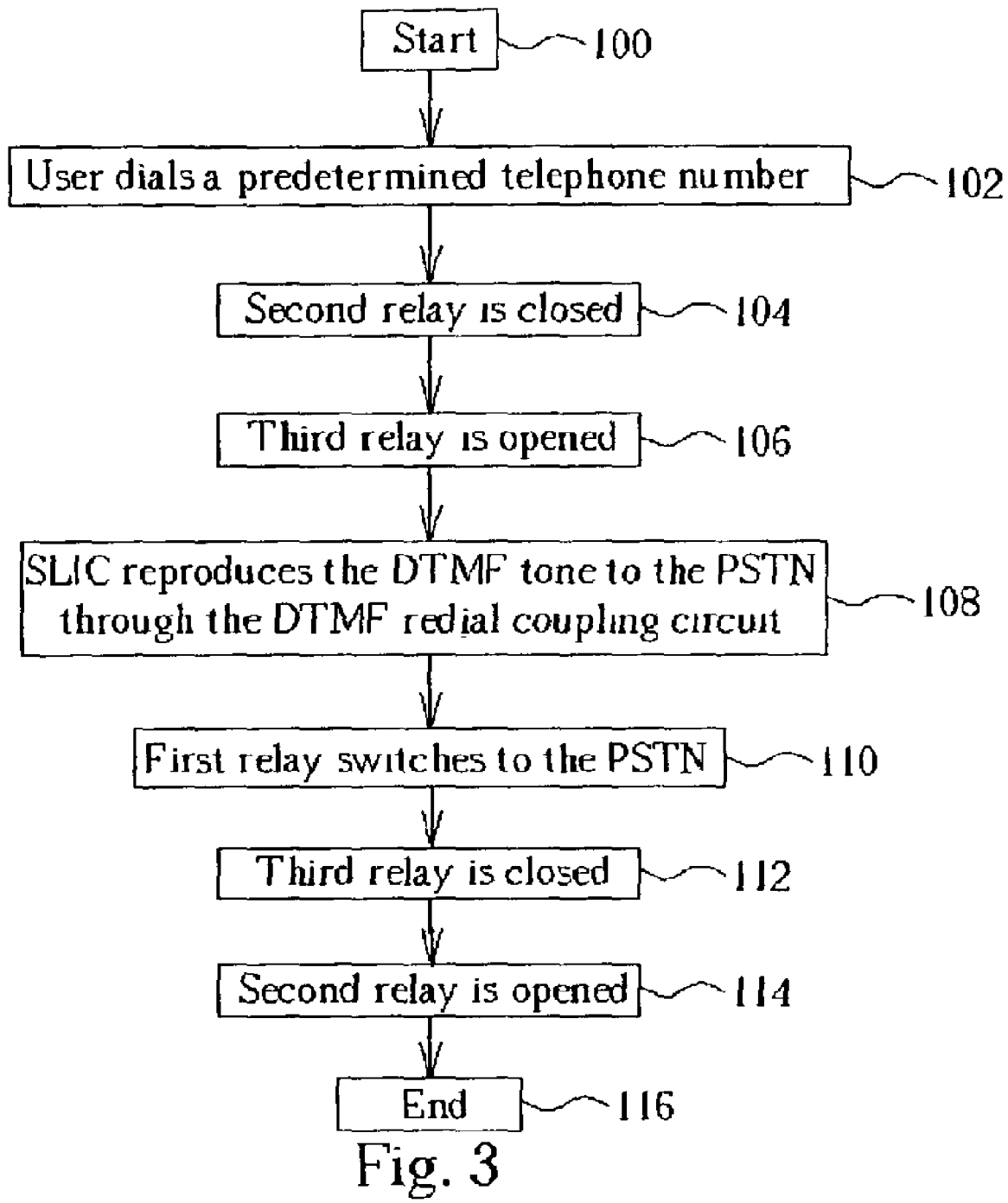
FIG. 3 is a flowchart illustrating silent DTMF redial process for a telephone that uses tone-dialing according to the present invention.

Please refer to FIG. 3. FIG. 3 is a flowchart illustrating silent DTMF redial process for a telephone that uses tone-dialing.

Step 100: Start;

Step 102:

User dials in tone dialing mode a predetermined telephone number that matches a dialing rule or a number stored in the modem. This initiates the redial procedure;

Step 104:

The control circuit 52 controls the second relay 50 to close. A connection between the dummy load 48 and the PSTN 42 is established to give the PSTN 42 an off-hook status;

Step 106:

The control circuit 34 controls the third relay 36 to open so as to disconnect the telephone set 32 from the SLIC 38;

Step 108:

The SLIC 38 reproduces a DTMF redial tone to the PSTN 42 through the DTMF redial coupling circuit 46;

Step 110: The first relay 40 switches to connect the telephone set 32 to the PSTN 42;

Step 112:

The control circuit 34 controls the third relay 36 to close, which establishes a connection between the first relay 40 and the SLIC 38;

Step 114:

The control circuit 52 controls the second relay 50 to open. This terminates the connection between the dummy load 48 and the PSTN 42; and Step 116: End.

Please note that steps 112 and 114 are performed after the generation of the redial signals has been completed in order to reset the VoIP modem redial system 30 back to its original state.

Figure 4:
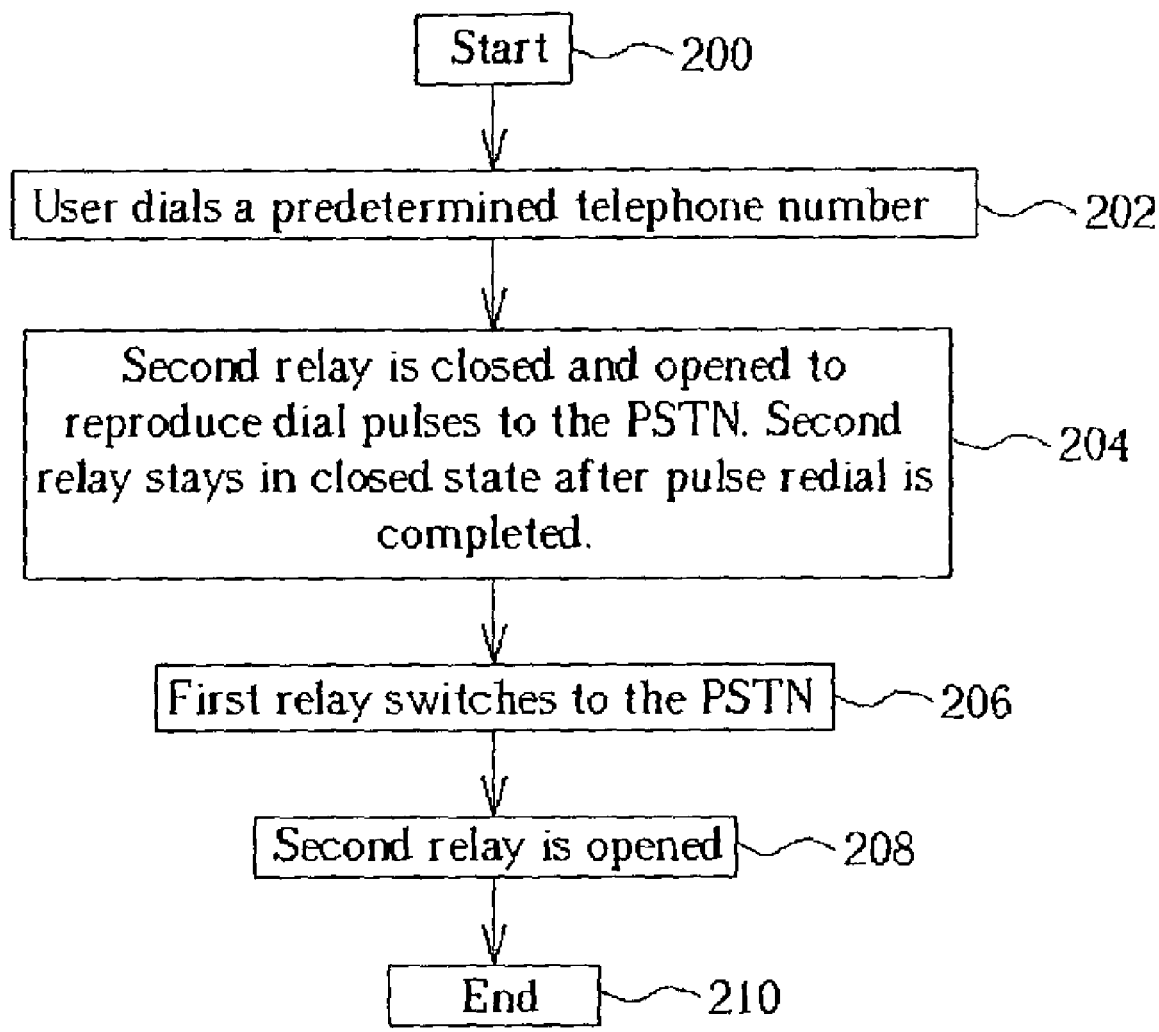
FIG. 4 is a flowchart illustrating silent pulse redial process for a telephone that uses pulse-dialing according to the present invention.

Please refer to FIG. 4. FIG. 4 is a flowchart illustrating silent pulse redial process for a telephone that uses pulse-dialing.

Step 200: Start;

Step 202:

User dials in pulse dialing mode a predetermined telephone number that matches a dialing rule or a number stored in the modem. This initiates the redial procedure;

Step 204:

The control circuit 52 controls the second relay 50 to close and open repeatedly to reproduce dial pulses to the PSTN 42. The second relay 50 stays in a closed state after the pulse redial is completed. A connection between the dummy load 48 and the PSTN 42 is established to give the PSTN 42 an off-hook status;

Step 206: The first relay 40 switches to connect the telephone set 32 to the PSTN 42;

Step 208:

The control circuit 52 controls the second relay 50 to open. This terminates the connection between the dummy load 48 and the PSTN 42; and Step 210: End.

Please note that step 208 is performed after the generation of the redial signals has been completed in order to reset the VoIP modem redial system 30 back to its original state.

Compared to the prior art, the VoIP modem redial system 30 according to the present invention uses the second relay 50 and the third relay 36 to control connection of the telephone set 32 to the PSTN 42. When a user dials a predetermined code or telephone number, the second relay 50 is closed to establish a connection between the dummy load 48 and the PSTN 42. Next, in the tone dialing mode, the third relay 36 is opened to disconnect the telephone set 32 from the SLIC 38. Since the telephone set 32 is isolated from the redial signals, users will not hear the redialing tones or pulses when they are being sent to the PSTN 42. Then, after the redialing signals have been transmitted, the first and second relays 40, 50 are switched to connect the telephone set 32 to the PSTN 42. Thereby, the VoIP modem redial system 30 performs a silent redial process. This prevents the audible redialing sounds from distracting the user.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A redial system for a VoIP modem, comprising:
   a subscriber line interface circuit (SLIC), for interfacing analog telephone signals from a telephone set to the VoIP modem, and for generating, when receiving a dialed telephone number which matches a predetermined telephone number, redial signals to a public switched telephone network (PSTN);
   a first relay for selectively connecting the telephone set with the PSTN or connecting the telephone set with the SLIC;
   a dummy load;
   a second relay connected between the PSTN and the dummy load for selectively establishing or de-establishing a connection between the PSTN and the dummy load;
   a third relay connected between the first relay and the SLIC for selectively establishing or de-establishing a connection between the first relay and the SLIC; and
   a control means for controlling the second and third relays to establish the connection between the PSTN and the dummy load and de-establish the connection between the first relay and the SLIC during the generation of the redial signals.

2. The system of claim 1, wherein, after the generation of the redial signals, the first relay is switched to connect the telephone set with the PSTN and the control means controls the second relay to de-establish the connection between the PSTN and the dummy load.

3. The system of claim 1, wherein, after the generation of the redial signals, the control means controls the third relay to establish the connection between the first relay and the SLIC.

4. The system of claim 1, further comprising an off-hook and ring detect circuit electrically connected to the telephone set and the PSTN through the first relay for detecting an off-hook status of the telephone set and incoming calls.

5. The system of claim 4, further comprising a DTMF (dual tone multi-frequency) redial coupling circuit electrically connected between the SLIC and the PSTN for passing the redial signals to the off-hook and ring detect circuit and isolating voltages of the off-hook and ring detect circuit from voltages of the SLIC.

6. The system of claim 1, wherein the predetermined telephone number is stored in the SLIC.

7. The system of claim 1 wherein the first relay is a mechanical relay.

8. The system of claim 1 wherein the second and third relays are photo relays.

9. A redial system for a VoIP modem, comprising:
   a subscriber line interface circuit (SLIC), for interfacing analog telephone signals from a telephone set to the VoIP modem;
   a first relay for selectively connecting the telephone set with the PSTN or connecting the telephone set with the SLIC;
   a dummy load;
   a second relay connected between the PSTN and the dummy load for selectively establishing or de-establishing a connection between the PSTN and the dummy load;
   a control means for controlling the second relay to establish the connection between the PSTN and the dummy load and to alternatively de-establish and establish the connection between the PSTN and the dummy load so as to generate redial pulse signals to the PSTN when the SLIC receives pulse-dialing signals of a telephone number which matches a predetermined telephone number.

10. The system of claim 9, wherein, after the generation of the redial pulse signals, the first relay is switched to connect the telephone set with the PSTN and the control means controls the second relay to de-establish the connection between the PSTN and the dummy load.

11. An automatic redial method in a VoIP modem having a relay for selectively connecting a telephone set with a public switched telephone network (PSTN) or with a subscriber line interface circuit (SLIC) of the modem, the method comprising the steps of:
   a) controlling the relay to connect the telephone set with the SLIC;
   b) receiving in the SLIC a dialed telephone number which matches a predetermined telephone number;
   c) establishing a connection between the PSTN and a dummy load;
   d) de-establishing a connection between the relay and the SLIC;
   e) generating redial signals from the SLIC to the PSTN; and
   f) controlling the relay to connect the telephone set with the PSTN.

12. The method of claim 11, further comprising the steps of:
   g) de-establishing the connection between the PSTN and a dummy load; and
   h) establishing the connection between the relay and the SLIC.

13. An automatic redial method in a VoIP modem having a relay for selectively connecting a telephone set with a public switched telephone network (PSTN) or with a subscriber line interface circuit (SLIC) of the modem, the method comprising the steps of:
   a) controlling the relay to connect the telephone set with the SLIC;
   b) receiving in the SLIC pulse-dialing signals of a telephone number which matches a predetermined telephone number;
   c) establishing a connection between the PSTN and a dummy load;
   d) alternatively de-establishing and establishing the connection between the PSTN and the dummy load so as to generate redial pulse signals to the PSTN; and
   e) controlling the relay to connect the telephone set with the PSTN.

14. The method of claim 13, further comprising the step of:
   f) de-establishing the connection between the PSTN and a dummy load.

* * * * *